United States Patent
Lang et al.

(10) Patent No.: US 12,416,781 B2
(45) Date of Patent: Sep. 16, 2025

(54) INDIRECT REAR VIEWING SYSTEM WITH INDEX GEOMETRY COMPRISING AN ADJUSTMENT BALL WITH OVERTWIST INDEXING

(71) Applicant: MEKRA Lang GmbH & Co. KG, Ergersheim (DE)

(72) Inventors: Werner Lang, Ergersheim (DE); Elmar Finkenberger, Adelshofen (DE); Albrecht Popp, Weihenzell (DE)

(73) Assignee: MEKRA Lang GmbH & Co. KG, Ergersheim (DE)

( * ) Notice: Subject to any disclaimer, the term of this patent is extended or adjusted under 35 U.S.C. 154(b) by 670 days.

(21) Appl. No.: 17/713,374

(22) Filed: Apr. 5, 2022

(65) Prior Publication Data
US 2022/0317413 A1     Oct. 6, 2022

(30) Foreign Application Priority Data

Apr. 6, 2021   (DE) .......................... 102021108506.3

(51) Int. Cl.
*G02B 7/182*     (2021.01)
*B60R 1/06*      (2006.01)
*F16B 2/02*      (2006.01)

(52) U.S. Cl.
CPC ............... *G02B 7/182* (2013.01); *B60R 1/06* (2013.01); *F16B 2/02* (2013.01)

(58) Field of Classification Search
CPC .................................. G02B 7/182; B60R 1/06
(Continued)

(56) References Cited

U.S. PATENT DOCUMENTS

| 4,620,813 A | 11/1986 | Lacher |
| 4,662,772 A | 5/1987 | Schultz |

(Continued)

FOREIGN PATENT DOCUMENTS

| CN | 1520493 A | 8/2004 |
| DE | 3635278 A1 | 5/1987 |

(Continued)

OTHER PUBLICATIONS

German Office Action (with English translation) for corresponding DE Application No. DE 10 2021 108 506.3, dated Oct. 13, 2021, 6 pages.

(Continued)

*Primary Examiner* — Ricky D Shafer
(74) *Attorney, Agent, or Firm* — Dority & Manning, P.A.

(57) ABSTRACT

The invention relates to an indirect rear viewing system for a motor vehicle having a supporting element for fastening at least one reflective element, wherein the supporting element has a coupling region for a position variable fastening/attachment to an adjusting element, which in turn can be attached to the vehicle, wherein the coupling region contacts a counter contact regions, of the adjusting element, wherein interlocking anti rotation means are present on the supporting element and on the adjusting element, wherein the anti rotation means are forming an index geometry, which, in a first operating state, permits an adjustment of the supporting element relative to the adjusting element about two axes of rotation, which are transverse to one another, and, in at least a second operating state, permits a basic position change of the supporting element relative to the adjusting element about a third axis of rotation which is aligned transversely to the two other axes of rotation.

12 Claims, 12 Drawing Sheets

Figure 1:
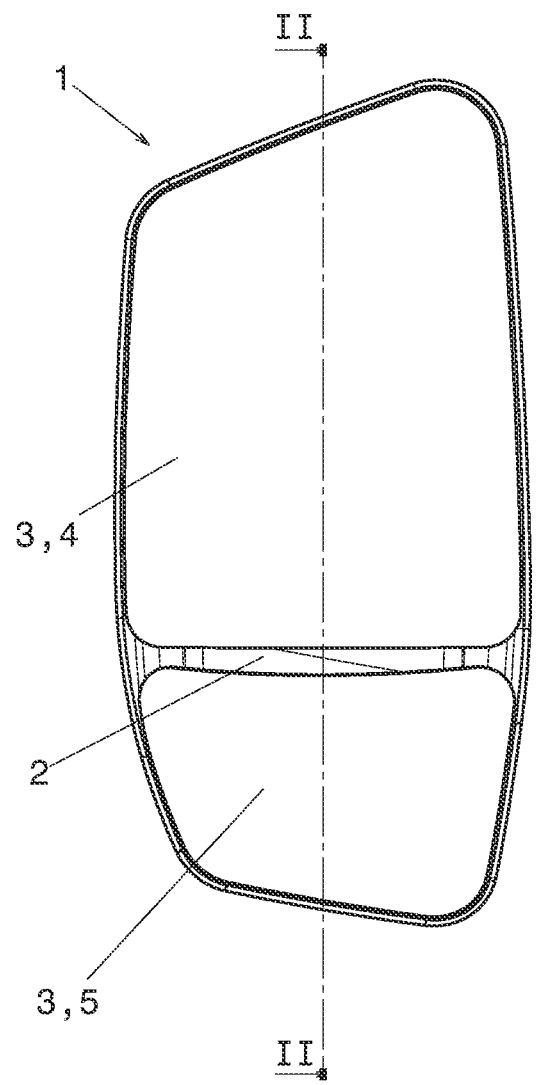

(58) Field of Classification Search
USPC .................... 359/872; 248/477, 481, 483
See application file for complete search history.

(56) References Cited

U.S. PATENT DOCUMENTS

| | | | | |
|---|---|---|---|---|
| 5,755,526 | A | 5/1998 | Stanevich | |
| 5,984,482 | A * | 11/1999 | Rumsey | B60R 1/04 248/478 |
| 6,877,709 | B2 * | 4/2005 | March | F16C 11/06 248/549 |
| 6,948,822 | B2 * | 9/2005 | Stenzel | B60R 1/0612 359/872 |
| 7,645,044 | B2 * | 1/2010 | Lee | B60R 1/072 359/872 |
| 8,210,695 | B2 * | 7/2012 | Roth | B60R 1/12 359/872 |
| 8,246,266 | B2 | 8/2012 | Lang et al. | |
| 8,960,629 | B2 * | 2/2015 | Rizk | F16M 11/14 248/481 |
| 9,352,691 | B2 * | 5/2016 | Watson | G02B 7/182 |
| 10,816,032 | B2 | 10/2020 | Lang et al. | |
| 12,194,920 | B2 * | 1/2025 | Lang | F16C 11/08 |
| 2002/0088916 | A1 | 7/2002 | March et al. | |
| 2004/0196577 | A1 * | 10/2004 | Carter | B60R 1/088 359/603 |
| 2006/0274443 | A1 | 12/2006 | Lang et al. | |
| 2008/0063465 | A1 | 3/2008 | Lang et al. | |
| 2008/0073477 | A1 | 3/2008 | Lang et al. | |
| 2014/0097320 | A1 | 4/2014 | Rizk et al. | |
| 2015/0129738 | A1 | 5/2015 | Bögelein et al. | |
| 2018/0172066 | A1 | 6/2018 | Lang et al. | |

FOREIGN PATENT DOCUMENTS

| | | |
|---|---|---|
| DE | 102005025614 A1 | 12/2006 |
| JP | 2014234112 | 12/2014 |
| JP | 2016155435 | 9/2016 |
| JP | 2018-154287 | 10/2018 |
| KR | 1020180070487 A | 6/2018 |

OTHER PUBLICATIONS

Korean Intellectual Property Office Notice of Allowance (w/ English translation) for corresponding Application No. 10-2022-0042752, mailed Feb. 22, 2024, 4 pages.
Communication under Rule 71(3) EPC (w/ English Machine Translation) for corresponding EP Application No. 22163726.7, dated Jul. 18, 2024, 18 pages.
Brazilian Office Action (w/ English translation) for corresponding Application No. BR102022005363-4, dated Oct. 2, 2024, 7 pages.
Extended European Search Report (w/ English translation) for corresponding European Application No. EP 22163726.7 dated Jan. 16, 2023, 16 pages.
Japanese Office Action (w/ English translation) for corresponding Japanese Application No. 2022-063230, dated May 8, 2023, 7 pages.
Notice of Allowance (with English translation) received in corresponding BR Application No. 102022005363-4, dated Apr. 22, 2025, in 10 pages.
Office Action (with English translation) received in corresponding CN Application No. 202210358426.9, dated May 24, 2025, in 8 pgs.

* cited by examiner

INDIRECT REAR VIEWING SYSTEM WITH INDEX GEOMETRY COMPRISING AN ADJUSTMENT BALL WITH OVERTWIST INDEXING

This application claims the benefit of priority to German Patent Application DE102021108506.3, filed on Apr. 6, 2021, the disclosure of which is incorporated by reference herein in its entirety.

The invention relates to an indirect rear viewing system for a motor vehicle, such as a commercial vehicle, an agricultural/construction machine, for example, a tractor, or such as a truck, a bus and/or a delivery van, having a supporting element for fastening at least one reflective element, such as, for example, a mirror glass, wherein the supporting element has a coupling region for a position variable fastening/attachment to an adjusting element, which in turn can be attached to the vehicle or is attached to the vehicle, wherein the coupling region contacts a counter contact region of the adjusting element, wherein furthermore interlocking anti rotation means are present on the supporting element and on the adjusting element, for example, in accordance with the tongue and groove principle.

Various adjustment units are known from the prior art. For example, the German Patent DE 101 63 318 C1 originates from the applicant. Here, a joint assembly is protected, namely a joint device for the arrangement of two components at an angle to each other, in particular for rear view mirrors with an adjustable plate glass pane, comprising a first joint component with a ball socket, a second joint component, which has a projection substantially in the form of a spherical segment, which is fitted into the ball socket, a sliding part and a connecting device for producing a clamping connection between the first joint component, the sliding part and the second joint component, wherein the sides of the ball socket, the sliding part and the projection, which are facing one another, each have a convex structuring and a concave structuring, which is formed complementary thereto, wherein a first and a second axis of rotation between the sliding part, the ball socket and the projection is being defined by the structuring. A special emphasis is put on the fact that the concave structuring is more curved than the convex structuring, at least in the unloaded state.

The European Patent EP 3 335 938 B1 also originates from the Applicant. In this patent, a ball joint device for the adjustable arrangement of a first and a second joint component about a pivot point is protected. In this regard, the patented ball joint device has a spherical surface member on the first joint component, which has an outer surface, which is a part of a spherical surface, and has a first radius of curvature with a first midpoint. An engagement means on the second joint component, which is contacting the spherical surface member with a first contact surface, is also provided.

Also, said device has a concave spherical cap shaped receptacle, which is disposed within the spherical surface member on the first or second joint component which has a second radius of curvature with a second midpoint. The second or the first joint component has a concave spherical cap. The second or first joint component has a convex spherical cap, which is supported by a second contact surface in the spherical cap shaped receptacle. In this case, the first radius of curvature is greater than the second radius of curvature. The insert device engages over the spherical surface member and the two joint components with each other in the manner of a snap fastener connection. As a special feature, it is protected in said earlier patent that the spherical surface member in sections is formed in the shape of a spherical ring, and that the spherical surface member has a plurality of spherical ring shaped sections which are distributed over the circumference.

The further State of the Art is known from the JP 2018-154 287 A and the U.S. Pat. No. 5,755,526 A.

The JP 2018-154 287 A discloses a lateral rear view mirror comprising a rod which is provided with a spherical portion at a tip; a housing, in which a recessed spherical surface portion is provided in a connecting portion on its own inner side, which is fixed with a mirror surface body thereto, and into which the spherical portion is fitted; a holding plate, which is provided with a recessed spherical surface portion, which is mated with the recessed spherical portion, is disposed opposite to the connecting portion in order to surround the spherical portion between the mutual recessed spherical surface portions, and is holding the spherical portion in the connecting portion in order that it can oscillate; and an oscillation range regulating plate, which is manually and rotatably held in a horizontal direction between a support groove on the housing side, which is formed in the connecting portion, and a support groove on the side of the holder plate, which is formed in the holding plate, and which is regulating an oscillation range of the housing from an unrestricted position to a maximum restricted position.

The U.S. Pat. No. 5,755,526 A discloses a ball joint which comprises a socket with a chamber. A ball pivot includes a ball end. The ball end is movable relative to the socket in a first direction into the chamber in the socket. The socket has first portions, which can be engaged with the ball end in order to block the rotation of the ball end about a first axis during movement of the ball end into the chamber. A resilient retainer is deflected during the movement of the ball head into the chamber. When the ball end is located in the chamber, the retainer is set in upright position in order to rotate the ball end into an operating position in the chamber. The socket has second portions, which can be engaged with the ball head in order to block movement of the ball head out of the chamber, when the ball head is located in the operating position. The engagement of the retainer into a retainer opening in the socket blocks the rotation of the ball end from the operating position.

It is the task of the present invention to mitigate or at best eliminate the disadvantages which are known from the prior art.

According to the invention, this task is solved by the fact that the anti rotation means form an index geometry which, in a first operating state, permits an adjustment/a pivoting of the supporting element relative to the adjusting element about two axes of rotation, which are transverse to one another, preferably orthogonal to one another, and, in a second operating state, permits a basic position change/an adjustment/a pivoting of the supporting element relative to the adjusting element about a third axis of rotation, which is aligned transversely to the two other axes of rotation, preferably in an orthogonal manner to these axes. It should be noted that in all operating states, also in this at least one second operating state, a "normal" adjustment about the vertical/height axis and a first horizontal/transverse axis also remains possible, precisely in order to achieve a left/right adjustment and an up/down adjustment of the mirror.

The anti rotation means are understood to be those means, which in at least one specific operating state, in particular in the first operating state, make it impossible for the supporting element to rotate relative to the rotation element about a specific axis of rotation, while a rotation/pivoting about two further axes, which are orthogonal thereto, remains possible.

If an overtorque is present above a predetermined limit torque, a first basic position can be left and, after a sliding movement of the supporting element relative to the adjusting element, a second basic position can be assumed. This is where, preferably, an engagement, for example, snapping into place takes place.

In both basic positions, only "normal" adjustments about the vertical axis and one of the two transverse axes are possible, precisely in order to achieve a left/a right adjustment and an up/down adjustment of the mirror.

In the basic positions, of which there may also be more than two, the anti rotation means make it impossible to pivot about a further axis, that means about a second horizontal/transverse axis which is aligned in an orthogonal manner not only to the vertical/height axis but also to the first horizontal/transverse axis.

In particular for mirror systems, which are installed in many different vehicles, the number of geometrically necessary variants shows that different connection conditions exist. This can mean, for example, that a support structure must be connected in a horizontal manner (also on the left/on the right) to a mirror head, and that a vertical (top/bottom) connection is preferred for other vehicles. This results in a large number of variants which have to be provided. The invention now makes this possible in a simple manner. In particular, an indirect viewing system for a vehicle is provided, which has few geometric variants and is realizing many connections to a wide variety of vehicles or vehicle variants. While ball adjustments are usually being used, which prevent a mirror head from twisting around its (usually approximately horizontal) ball center line in the manner of a tongue and groove connection, when it is being adjusted (normal adjustment of the field of view by the driver), a more appropriate solution is now presented. The tongue and groove connection can now also be designed in a geometrically different shape, for example, in a trapezoid shape or in an undulating shape.

In other words, the invention relates to an indirect viewing system for a vehicle, which comprises at least one reflective element for indirect viewing, a supporting element and an adjusting element, wherein the supporting element accommodates the reflective element, and wherein the supporting element and the adjusting element can be pivoted relative to one another about a pivot point via spherical contact regions, wherein the special feature is the fact that, via an index geometry between the adjusting element and the supporting element, for example, in the manner of a tongue and groove connection, different operating positions can be predefined/defined radially about the ball center line between the adjusting element and the supporting element. The operating positions can still be (freely) selected after the mirror head has been mounted, since the index geometry is designed in an elastic manner.

Advantageous embodiments are claimed in the dependent patent claims and are explained in more detail below.

For example, it is advantageous, if the geometry, material thickness and material properties of the supporting element and the adjusting element are matched to each other in such a way that the transition from the first operating state to the second operating state is enabled/forced, if an overtorque is present which is greater than a predetermined limit torque. It could also be said that in order to reach at least a second operating position, an overtorque is required which is higher than the defined torque for keeping the supporting element stable in the index geometry.

It is advantageous in this regard, if the adjusting element has a crowned connection area which forms the counter contact region. An adjustability in different directions around the three axes of rotation, for example, can easily be realized as a result.

It is particularly advantageous in this regard, if the crowned connection area has sections in the form of spherical segments.

It is advantageous in this regard, if at least one first operating position is reached via the ball center line by, for example, 90°, 45°, 30° (horizontally/vertically/diagonally) to at least one second operating position. In this way, a nearly horizontally oriented or vertically oriented supporting structure can be connected. For example, a horizontal or vertical tube can be easily connected. A nearly horizontal or vertical or diagonal supporting structure outlet is then possible. Any other angle can also be implemented.

If the contact region forms a shell, which surrounds/accommodates the crowned connection area, a fastening principle in the manner of a snap fastener can be implemented by simple means. This is beneficial to the assembly process and is saving time.

With regard to the overtorque, it should be added that it is advantageous if the overtorque is preferably at least approx. 7.5%, approx. 10% or approx. 25% higher than the defined torque for keeping the supporting element stable. This also makes it possible to obtain a collision protection through damping and compliance of the index geometry. Therefore, the overtorque is higher than the predefined limit torque. Above the limit torque, for example, a snap connection is released. After the adjustment has been carried out, the index geometry is then again held independently.

It is also advantageous, if the index geometry is implemented in the form of a tongue and groove connection.

If, in this regard, the groove is being integrated into the supporting element, and the tongue is being integrated into the adjusting element, or if the groove is being integrated into the adjusting element, and the tongue is being integrated into the supporting element, solutions can be implemented in order to meet the requirements.

In this connection, it is also advantageous, if the index geometry is of resilient design, and/or at least one of its two constituting components.

If the resilient design is implemented by means of slots in the spherical contact regions, advantages are achieved in continuous operation, but also already during assembly.

Finally, the invention also relates to the design of the indirect (rear) viewing system in the manner of a mirror head.

The indirect (rear) viewing system can in particular be a head adjuster or a glass adjuster.

An advantageous embodiment is also characterized by the fact that the supporting element and the adjusting element are specifically designed in such a way that the restoring properties and the modulus of elasticity of the two components are matched to the contour of the interlocking index geometry components in such a way that when the overtorque is present, the at least second operating state is forcibly assumed.

When the overtorque is present—above the predefined limit torque—the basic position assumed up to that point in time is left. A movement to the second basic position takes place. There, an engagement takes place again. The force, which is required for the independent engagement or snapping can be provided by the restoring force of at least one of the two components made out of an elastic material which is forming the index geometry.

In particular, it has proven useful in this connection to design a first index geometry component as a groove/a slot/a furrow, for example, in the manner of a tongue and groove configuration, and a second index geometry component as a projection/a rib/a prominence, for example, in the manner of a tongue and groove configuration.

For a further development, it is advantageous, if the groove/the slot/the furrow is present on the supporting element, in particular on its (inner) side, which is facing the adjusting element, and the projection/the rib/the prominence is present on the adjusting element, in particular on its (outer) side which is facing the supporting element, or vice versa.

In order to also provide an overload protection and allow a folding down in case of an emergency, it is advantageous, if the limit torque is approx. 10% or approx. 20% or approx. 30% or, more preferably, approx. 33% greater than the (normal) torque, which occurs in the first operating state, which is required in order to keep the supporting element stable relative to the adjusting element. In this case, a special alignment/adjustment of the internal geometry, for example, of the groove/the slot/the furrow, is advantageous.

A precise adjustment is possible, if the projection engages into the groove/the slot/the furrow without play and/or is supported in the same. However, a play of a few tenths of a millimeter in the sense of a quasi zero backlash or almost zero backlash is acceptable. These considerations must be taken into account in particular against the background of manufacturing tolerances and a component distortion.

An advantageous embodiment is also characterized by the fact that the projection has, in a cross-section orthogonal to the longitudinal axis of the groove/the slot/the furrow, a beveled side which is contoured in order to make a line contact with the material which is forming the groove/the slot/the furrow. As a result of the beveled side and the elastic index geometry, the limit torque is generated and/or is predetermined by it. When the first basic position is left, an inclined plane must be overcome. The ratio of the slope to the contact force (predetermined by the section modulus of a link, for example) determines the limit torque.

In this context, it is particularly preferred, if the projection has a conical contour or a truncated cone contour or a contour in the form of a spherical segment or a spherical/ellipsoidal contour at least in the active area, hence where the slope, which is necessary when leaving or for leaving the basic position, is present. An adjustment without any problems in all spatial directions, if possible, can then be made. The active area can only be present in a certain angular range of the projection and can then have the said slope precisely only in this location. In the other angular ranges this slope can be missing. Where the slope is missing, there is no active area. In other words, at least in the area of that angular range, in which the adjustment and a "jumping out" is forced, an "active contour", which is having the slope, is present. For reasons of symmetry and manufacturing reasons, the slope can, however, also be present in those angular ranges in which there is no active area.

It is advantageous in this connection, if the groove/the slot/the furrow has a depth which is between approx. 10% to approx. 45% of the thickness of the coupling region.

It has proven useful, if the index geometry is composed of two components, at least one of which is formed in an elastic manner.

It is also advantageous, if the coupling region is present, for example, close to the center/midpoint of the supporting element and is designed for, for example, pressurizing—for example, by positive or non positive—contacting with the crowned connection area of the adjusting element, for example in the manner of a snap fastener configuration.

It is also advantageous, if the coupling region has a first contact region and a second contact region, which is axially offset with respect thereto, wherein the axial direction is being defined by the insertion direction of the adjusting element into the supporting element or a horizontal axis, preferably, by a pivot point about which the supporting element can be pivoted.

If an imaginary parting surface is running through a region of the transition of a main body of the supporting element into the coupling region in a planar manner, then further configurations can be used. The parting surface may be planar, hence can be formed as a parting plane. The parting surface is extending through the area of transition from the main body of the supporting element into the coupling region of the supporting element on both sides of the pivot point. Different spatial configurations of the parting surface are possible. For example, open space designs can be implemented. In particular, the parting surface can be of a planar design, hence a flat design, and in this particular case is then forming a parting plane.

One of these configurations occurs, for example, when the first contact region is running along one side of the imaginary parting surface, and the second contact region is running along the other side of the imaginary parting surface.

Thus, it is further advantageous, if the first contact region is formed as an inner contact region, which is located inside a space, which is defined by the supporting element and the reflective element, and the second contact region is formed as an outer contact region. A splitting of the force flow from the area of transition of the main body of the supporting element into the coupling region of the supporting element into two different, preferably opposite directions, is then the result. The total force flow is now distributed as evenly as possible, which is avoiding a breakage of the supporting element, and causes a better retention of the supporting element at the crowned connection area of the adjusting element.

Due to the fact that the first contact region is located inside the space, which is defined by the supporting element and the reflective element, this contact region is also protected from dirt and contamination, which permits a long term good as well as low-friction use, and ensures the adjustability even in difficult conditions.

If the first contact region and the second contact region each have spherical inner contour segments in the form of spherical sections, an adjustment of one or both contact regions to the crowned connection area, in order to ensure a good adjustability, is possible in a particularly efficient manner.

An advantageous embodiment is also characterized by the fact that that the inside of the coupling region (of the supporting element) and the outside of the connection area (of the adjusting element) are matched to each other in such a way that by both components a pivot point is defined, about which the supporting element can be pivoted relative to the adjusting element. When the rear viewing system is in use, the user can then easily set an angular position of the two components relative to each other as required.

It is advantageous, if the connection area has counter contact regions in the form of a spherical segment. The pivoting/swiveling is facilitated as a result.

It is also advantageous, if the counter contact regions are adapted to the contact regions, which are in contact with them, in particular with regard to their contour. This makes it possible, for example, to integrate also subregions which deviate from a spherical geometry or to use also ellipsoidal subregions.

If the counter contact regions are connected via flattening areas and/or a flattening area, this facilitates assembly on the one hand, and relieves the load on the spring elements on the other hand, as well as prevents overdetermination(s) on the bearing surfaces.

For series production, it has proven advantageous, if the supporting element is formed as a back wall and/or the adjusting element as a (rotary) pin, preferably made out of plastic material, such as, for example, polyimide, for example as an integral/one piece, single material component.

It is useful, if the adjusting element is fastened to the supporting element, for example, via a positive locking and/or non positive locking.

A particularly good fit of the two components against each other is ensured, if the adjusting element has a receptacle for connecting a vehicle fixed holder/telescopic rod holder, bar or (telescopic) tube or is itself designed accordingly.

In addition, it has proven useful, if the receptacle is designed as a blind hole, the bottom of which is stepped in order to prevent twisting.

The attachment options can be designed in a variety of ways, if the adjusting element has an indirect or direct connection area to the vehicle which, for example, comprises the blind hole.

The weight can be optimized if the two contact regions together form a spherical segment like shell which open out into the main body in the area of the transition.

It is beneficial to the compactness of the system, if the main body meets the shell in the area of the transition at an angle α of 15° to 125°+/−5°, preferably 90°+1-2.5°, wherein the angle α is being spanned between, on the one hand, an imaginary straight line through the area of the transition from the main body into the coupling region and, on the other hand, an imaginary straight line which is extending in the axial direction through the (spherical) midpoint of the connection area and/or the pivot point.

If the main body provides an imaginary bearing line in the direction of the pivot point, which intersects a theoretical sphere around the pivot point with a diameter of 50 mm, 60 mm or 70 mm, the force curve in the direction of the center of the connection area is particularly good.

It has also proven useful, if a glass element is attached to the supporting element, for example, by means of a positive and/or non positive locking, in particular, for example, by means of a clip solution, and the glass element is designed as a mirror glass.

An advantageous embodiment is also characterized by the fact that a spring force is applied to (at least/only) one of the two contact regions, preferably the first contact region, or both contact regions in the mounted state, which spring force forces the coupling region, at least in each inner direction of the contact region towards the coupling region, preferably in the direction of the pivot point, A self-fixing after an adjustment is thus facilitated, and a variability for achieving a good reproduction of the driver's rear field of view is the result.

It is useful, the spring force is provided by a spring element, such as, for example, a ring or a clamp. The spring element can have one or more coils.

Such a separate spring element allows the spring force to be selectively set. It has also proven useful, if the ring has a closed or open, for example, a slotted cross section. The assembly, in particular in the second case, and the fatigue strength/fatigue loading capacity, in particular in the first case, is improved as a result.

In order to ensure also a long service life with unchanged technical basic conditions, it is advantageous, if the spring element is produced from/made out of a metallic material, such as, for example, comprising an iron alloy, for example, in the form of spring steel.

In order guarantee a simple modular design, it is advantageous, if the spring element is designed as a compression spring which rests against the outside of the first contact region or the second contact region. This also facilitates a subsequent application.

For the connection of the individual components to one another, in particular in order to make it impossible for the components to get lost, it is advantageous, if a recess is formed on the outside of the (respective) contact region, for example in the manner of a trough, a groove or a channel, in which the spring element rests/sits/is arranged in the assembled state.

In order to keep a sliding area between the supporting element and the adjusting element permanently clean/free of contamination, it is advantageous, if a sealing function is implemented between one of the contact regions and its associated counter contact region, preferably the first contact region and its associated counter contact region, by means of the supporting element and/or the adjusting element, for example, by means of an integrally formed sealing lip on one or both components, and/or an additional sealing element is installed/interposed between the supporting element and the adjusting element.

It is advantageous for the assembly, if the coupling region is formed completely or at least in sections/partially in an elastic manner.

It is also advantageous, if (primarily) only in the first contact region and/or (secondarily) only in the second contact region there are geometry changes, which cause elasticity, such as, for example, thinning, slots, releases, grooves, corrugations and/or similar designs.

In order to be able to specify different operating positions, it is advantageous, if the coupling region and the connection area are designed for forming an index geometry, by means of which certain predefined relative positions can be adopted between the supporting element and the adjusting element.

In this context, it is advantageous, if the index geometry is formed in the manner of a tongue and groove interlocking.

It has proven useful in this connection, if the coupling region has at least one groove/one trough/one channel or a plurality thereof on its inside, and wherein in at least one or more of these a projection (each) engages on the outside of the adjusting element or, as an alternative/as a supplement, the adjusting element has at least one groove/one trough/one channel or a plurality thereof on its outside, and wherein in at least one groove/one trough/one channel or a plurality thereof a projection (each) engages on the inside of the coupling region of the supporting element.

If the groove/the trough/the channel and/or the projection has a V-, U-, roof-shaped or polygonal contour in cross-section and/or both are formed to fit together (almost) without play, a wobble-free adaptation of the adjusting element to the supporting element and vice versa is possible.

In order to be able to design the adjustment also in an infinitely variable manner, it is advantageous, if the projection is installed/inserted in the groove/the trough/the channel/(continuously/discontinuously) in a displaceable/slidable manner.

In addition, it has also proven useful, if there are grooves/troughs/channels on opposite outer sides of the adjusting element, as seen from the pivot point, two of which are each filled with one projection each of the adjusting element at least in one section, and at least two or an integral multiple of grooves/troughs/channels remain without any projection.

If the grooves/the troughs/the channels are evenly distributed over the inner circumference of the coupling region, for example, every 90°, 45°, 22.5°, 12.25° or 6.125°, adjustments can be provided as required.

The invention finally relates to such an embodiment, in which a mirror head is formed and/or a head adjuster or a glass adjuster is included.

If the inner contact region and/or the outer contact region is radially closed and preferably has elastic subregions, a simple assembly is made possible, the possibility of contaminations is excluded and/or a dirt guard is provided.

The invention finally also relates to an assembly method for coupling a supporting element of the indirect rear viewing system of the type according to the invention to the adjusting element, wherein the supporting element is moved from the direction of the reflective element in the direction of the adjusting element, for example, via a counter contact region which is being formed there. A snapping on is the consequence.

A further development is the fact that the coupling region, which is forming the second contact region and/or the first contact region, is at first expanded, when it is being pushed onto the adjusting element, and then elastically springs back.

It is advantageous in this context, if the coupling region is clipped onto a spherical thickening/onto the crowned connection area of the adjustment element.

In other words, the invention relates to an indirect viewing system for a vehicle, wherein the angle α between a horizontal ball center line and a leg of the ball midpoint to the point of impact of the rear wall on the contact region is from a minimum of 15° to a maximum of 125°.

A further development can also be expressed by the fact that the adjusting element is integrally formed in one piece with the connection area to the vehicle and in active surfaces to the supporting element.

In addition, the direction of the rear wall in the area of the contact region can be designed in such a manner that it intersects a theoretical sphere with a diameter of 60 mm in a theoretical extension towards the sphere midpoint.

It is also considered to be advantageous that the assembly of the adjusting element to the supporting element is carried out from the direction of the reflective element from the inside to the outside, and the outer contact region and the inner contact region are radially closed, or the outer contact region is radially closed and the inner contact region has elastic subregions, Slots, openings, grooves and corrugations are suitable here. A segmentation and/or an implementation of a snap fastener principle is easier to achieve in this way. The slots produce an elastic spring effect in the contact region during this process.

In other words, the invention also relates to an assembly of the adjusting element to the supporting element from the direction of the reflective element from the inside to the outside, wherein the outer and the inner contact region of the supporting element is radially closed, and the adjusting element has elastic subregions.

If pressure is applied to the contact regions of the adjusting element at the outer or inner contact regions of the supporting element by means of a spring element, the friction is increased by means of the spring so that it forces a higher adjustment force for the adjustment.

It is advantageous, if a pressure is applied to the contact regions of the supporting element at the outer or inner contact regions of the adjusting element by means of a spring element.

It is advantageous in this context, if the spring element is a metal spring clip or an open or closed metal ring spring with one or more coils.

It is also advantageous, if a sealing function is integrated in the outer contact region of the supporting element and the outer contact region of the adjusting element. Molded on sealing lips on the supporting element are just as imaginable as additional sealing lips with a second material which are molded on. Additional sealing elements, which are mounted, are also imaginable.

If the indirect viewing system is mounted by means of a tube directly or indirectly on the vehicle, or the adjusting element is mounted directly or indirectly on the vehicle, and the adjusting element is designed integrally in one piece or in several parts in order to fasten the tube, further alternatives can be realized. In this case, a tube can be mounted on the vehicle in the case of a direct assembly, or an additional retaining element, such as a telescopic rod holder, can be used in the case of an indirect assembly.

It is advantageous, if the tube is clearly defined, positioned and fixed in the adjusting element via positive locking, hence corresponding geometric shapes. This has the advantage that the unambiguous positioning of the indirect viewing system ensures that a required field of view is always maintained, for example, in order to meet customer requirements or to comply with legal requirements for fields of view, such as, for example, the standards UN/ECE-R46 or ISO 5721-2 or ISO 5006. In addition, the mirror head with the adjusting element is mounted in such a manner that it cannot be lost and cannot "fall off", if the frictional connection is lost or reduced.

It is also advantageous, if the indirect viewing system is attached directly to the vehicle by means of the adjusting element, for example. by means of an adjusting element, which is mounted on the vehicle, and the adjusting element is made integrally in one piece or in several parts.

It is also advantageous, if via an index geometry between the adjusting element and the supporting element, for example, in the manner of a tongue and groove, different operating positions between the adjusting element and the supporting element can be set radially around the horizontal ball center line. The operating positions can still be selected after the mirror head has been mounted, since the index geometry is designed in an elastic manner. By this, it is also possible to achieve a collision protection through damping and resilience of the index geometry.

As it has already been explained, it is advantageous if the indirect viewing system is a mirror head and/or if the indirect viewing system is a head adjuster or a glass adjuster.

Many advantages can be seen with the solution according to the invention. For example, there is an optimized force flow from the supporting element to the adjusting element, since the force is introduced between the inner and the outer contact region, and the force is better transmitted from the supporting element to the adjusting element in this way. The number of components is reduced as well because the function and the geometric shape are integrated. The contact regions of the supporting element and of the adjusting element wrap around each other, and no additional sliding element or joining element is required. The assembly is simplified because fewer component parts are required. The costs are reduced as a result as well. In one embodiment, the adjustment mechanism only needs to be "snapped" into place, and no joining element such as, for example, a screw or a locking bolt is required.

Due to the index geometry in the form of a tongue and groove combination, an adjustment is made possible when a greater torque is applied, for example, in order to switch from vertical to horizontal mounting.

Another positive aspect relates to the routing of an electric cable by means of which a connection of electric modules, such as, for example, heating foils, for example, on the rear side of the mirror (this means, inside the space which is limited by the glass element and the supporting element), blind spot and/or parking distance systems, can be realized. Such electric cables/supply lines can then be routed through the interior of the crowned connection area of the adjusting element and/or the sphere which is formed by the adjusting element.

At the same time, the solution makes it possible to protect the component parts even in the event of a collision, as a twisting is possible via the torque in order to keep the supporting element stable. It is also possible to produce variants after the mirror head has been mounted, for example, in the case of a horizontal or desired vertical exit of a support structure towards the vehicle. This will result in a cost advantage.

Geometric mirror heads can be used not only on the left side but also on the right side of a vehicle because the connection can be rotated by 180° over two operating positions. By this, variants are being reduced, which results in less work with respect to production, logistics and warehousing not only for the manufacturer but also for sales (in particular in the trade and for vehicle manufacturers).

Figure 2:
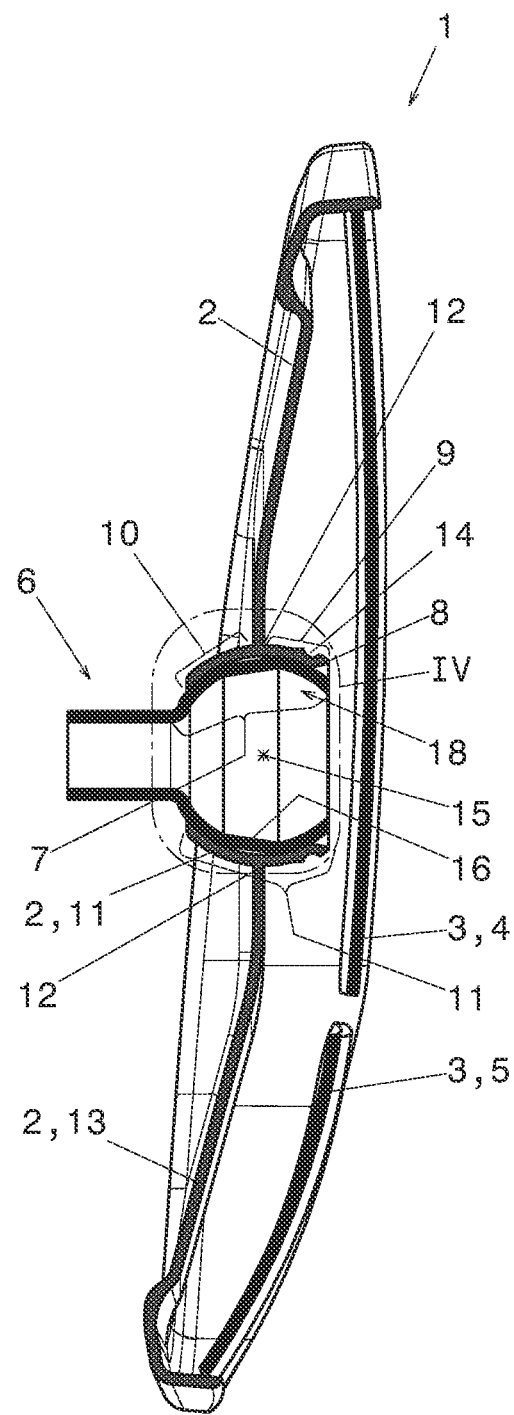
Figure 3:
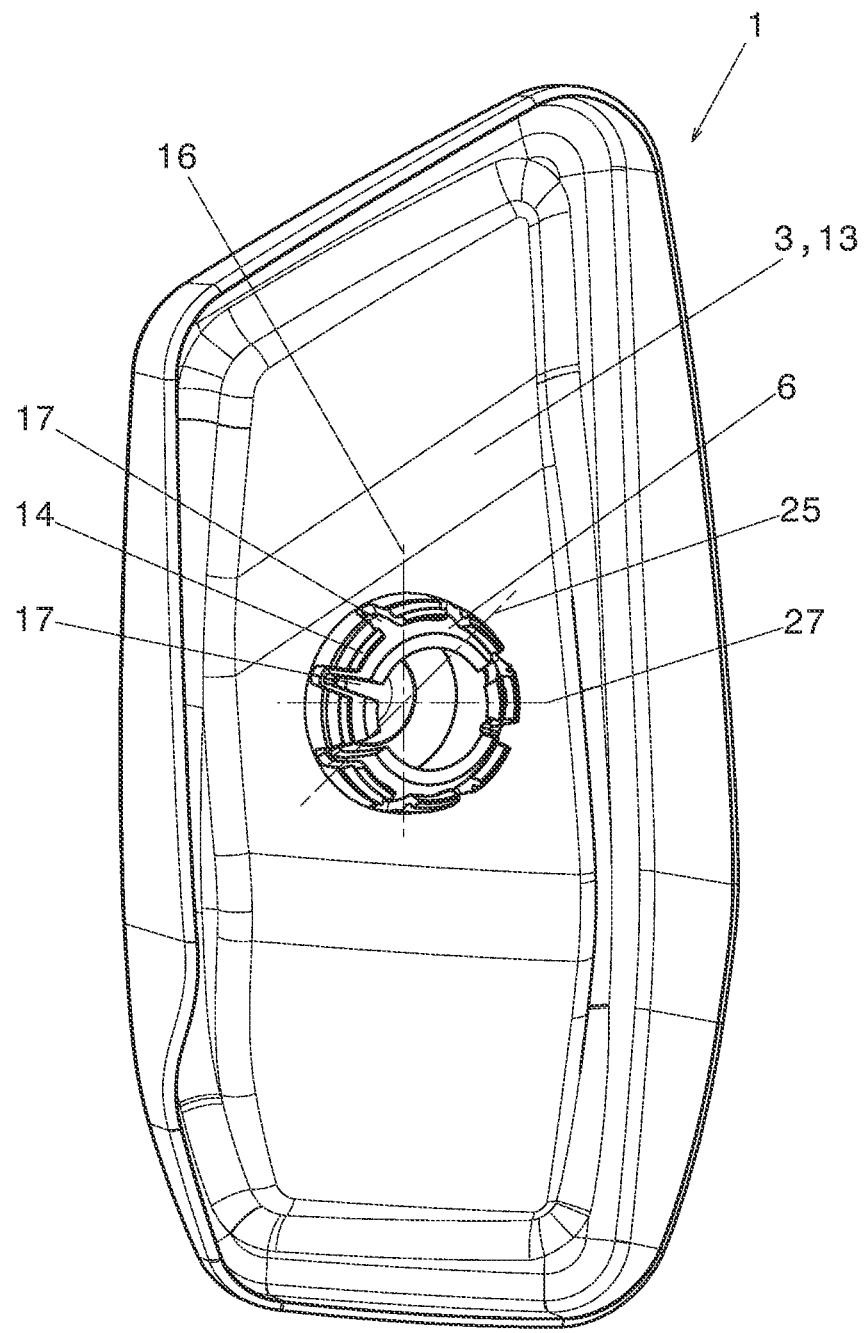
Figure 4:
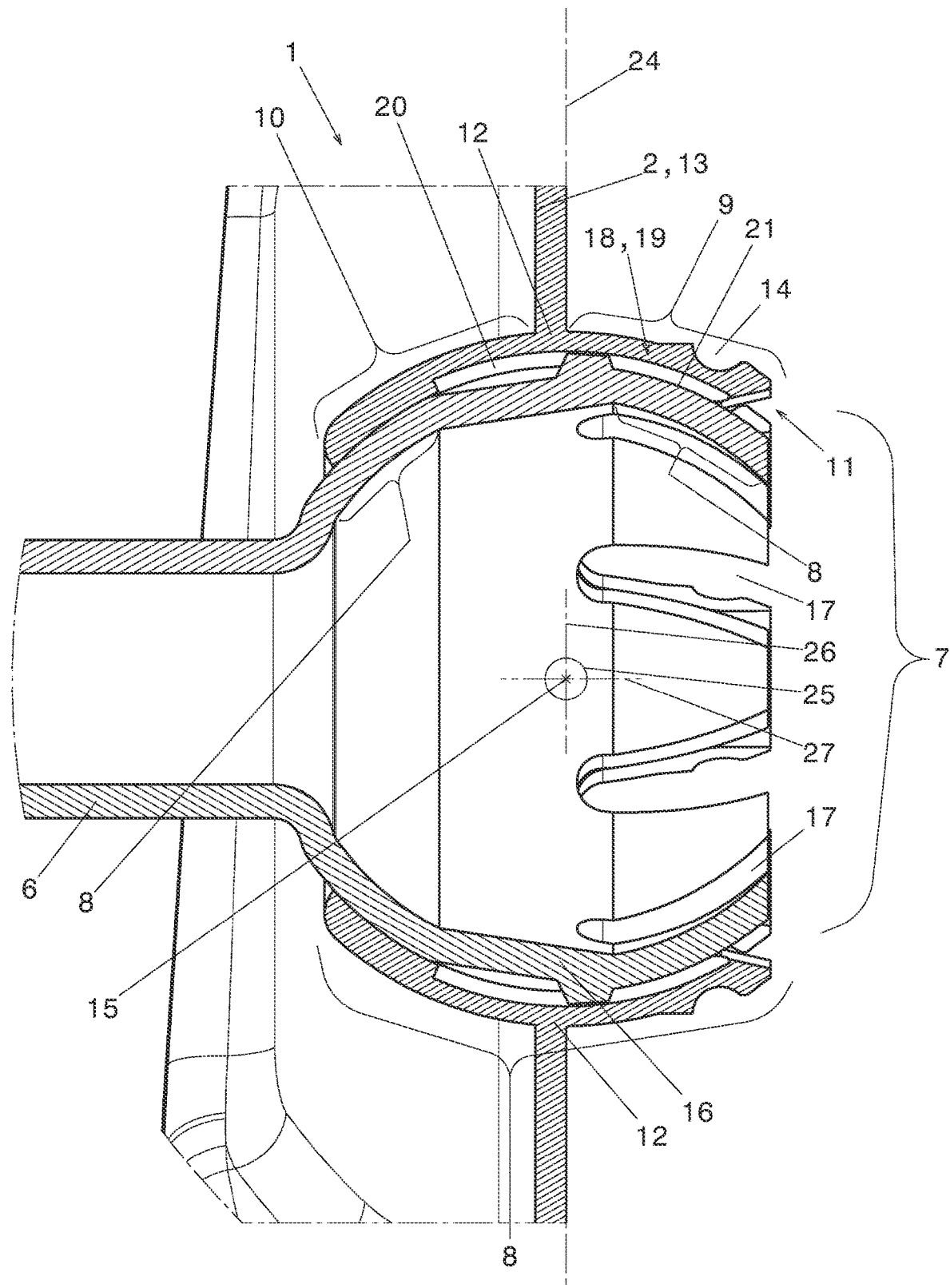
Figure 5:
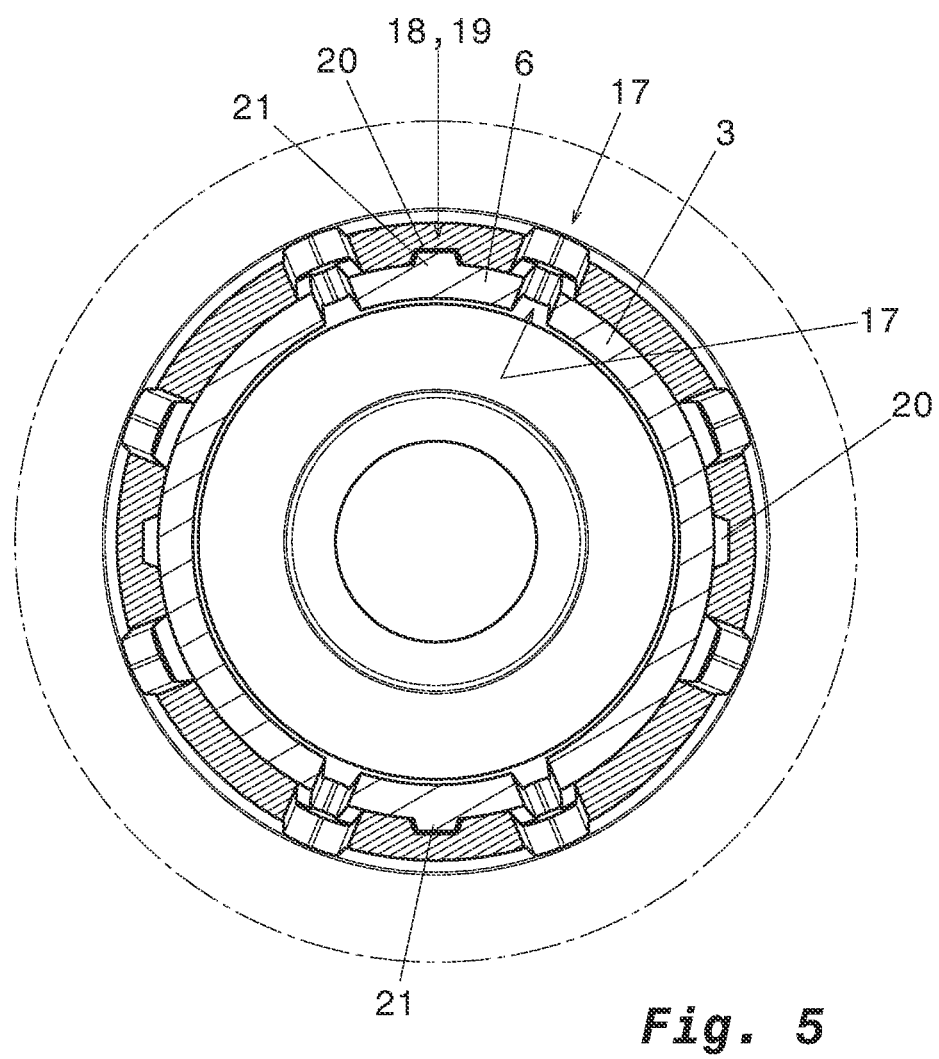
Figure 6:
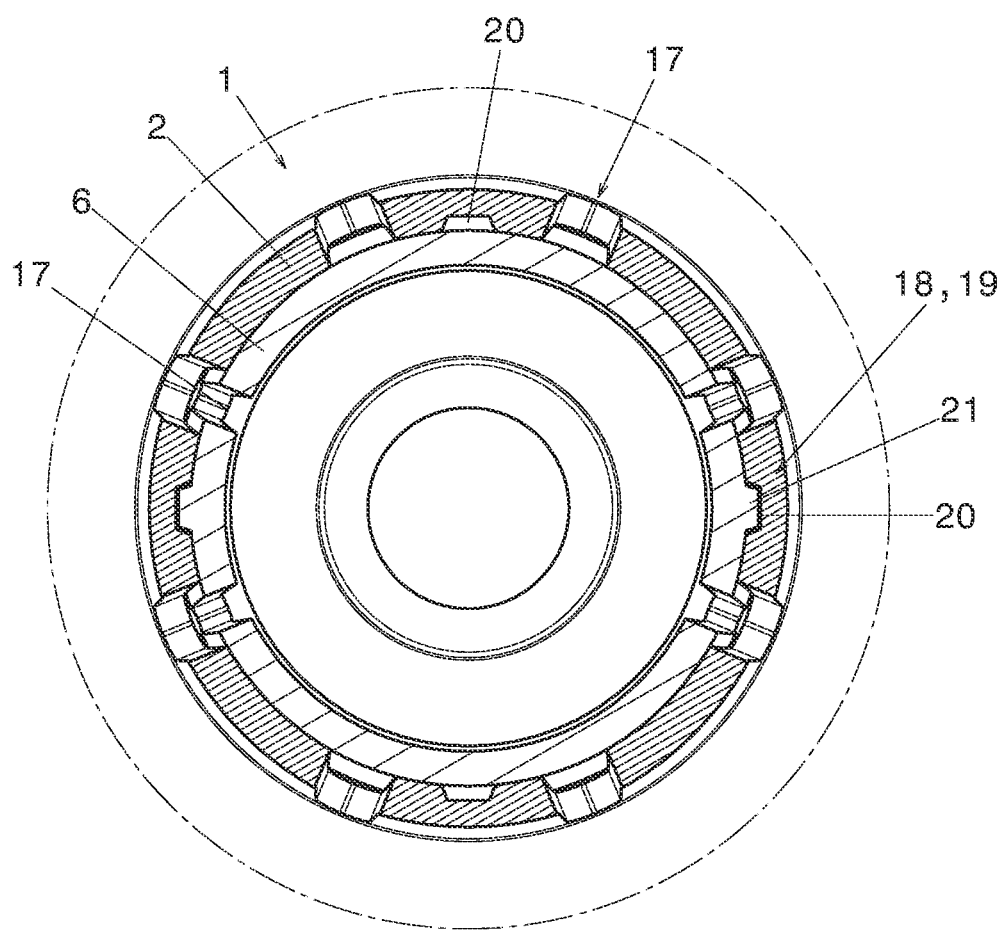
Figure 7:
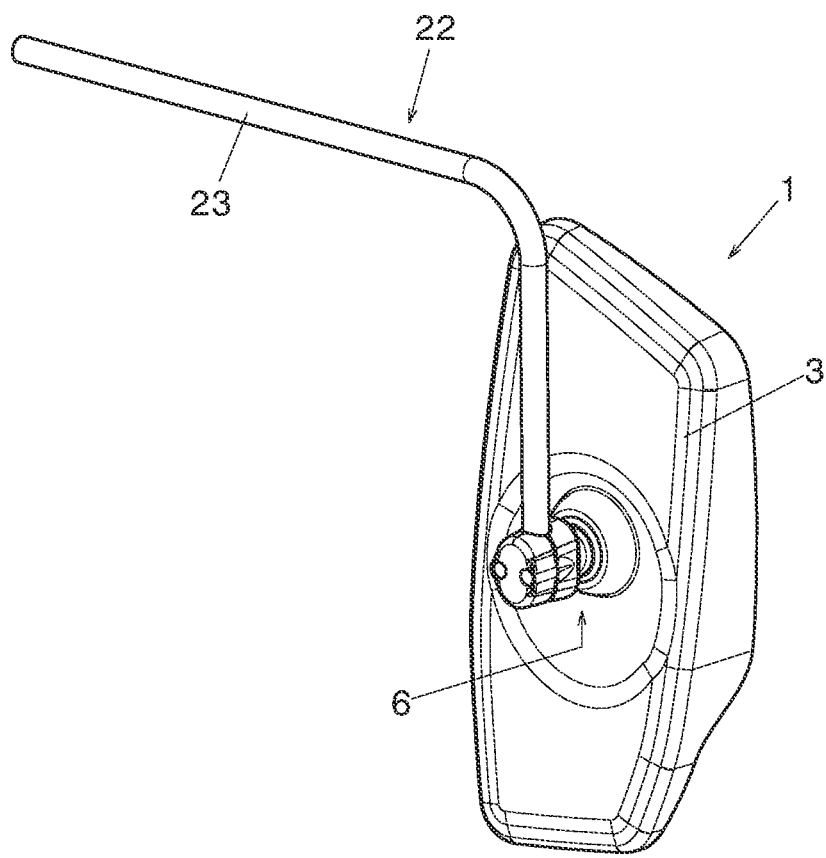
Figure 8:
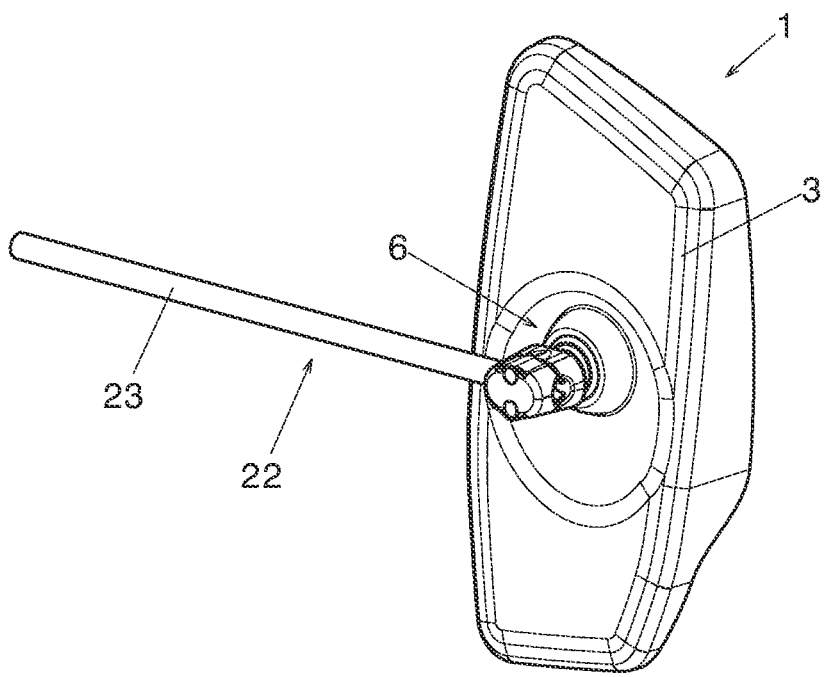

The invention is explained in more detail below with the aid of several embodiments by means of a drawing. It shows:

FIG. 1 an isometric view of an indirect rear viewing system according to a first embodiment of the invention for a motor vehicle, namely a truck, a bus or a van, respectively, FIG. 2 a longitudinal section along the line II of FIG. 1 through the rear viewing system of the first embodiment, FIG. 3 a rear view of the rear viewing system of FIGS. 1 and 2, FIG. 4 an enlargement of the area IV from FIG. 2, FIG. 5 a view on the area in FIG. 4 from behind, similar to the representation in FIG. 3, FIG. 6 a second embodiment in a representation comparable to FIG. 5, FIG. 7 a connection of the adjusting element which is included in both embodiments to a tube which is extending vertically in the connection area, FIG. 8 a connection of the other embodiment to a tube which is horizontally aligned in the connection area, and FIGS. 9 to 23 different embodiments in different views and sections/detailed views.

The figures are merely of a schematic type, and are intended only to aid the understanding of the invention. The same elements are provided with the same reference numerals. The features of the individual embodiments can be exchanged with each other.

In FIG. 1, an indirect rear viewing system is provided with the reference numeral 1. It has a supporting element 2 for fixing at least one reflective element 3. There are two reflective elements 3, namely an upper mirror glass 4 and a lower mirror glass 5.

In FIG. 4, the first axis of rotation is provided with the reference numeral 25, the second axis of rotation is provided with the reference numeral 26, and the third axis of rotation is provided with the reference numeral 27.

It can already be seen in FIG. 2 that an adjusting element 6 is present in the center of the supporting element 2. The adjusting element 6 has a crowned connection area 7. The crowned connection area 7 has counter contact regions 8 which correspond with a first contact region 9 and a second contact region 10 of a coupling region 11. The coupling region 11 is present in the middle/in the center of an area of transition 12 of the supporting element 2. The area of transition 12 is that area of a transition at which a main body 13 passes into the coupling region 11.

In the first contact region 9 there is a trough 14 into which a spring element can be inserted. There is a pivot point 15 about which the supporting element 2 can be rotated. The connection area 7 has at least one flattening 16 between the counter contact regions 8 which are axially separated from each other. Not only the coupling region 11 but also the connection area 7 can be designed in an elastic manner, in particular it can have slots 17, as these are also shown in FIG. 3.

In FIG. 4, the index geometry 18 according to the invention is shown in a larger manner. The index geometry 18 represents anti rotation means 19. In particular, it is composed of component parts which are implementing a tongue and groove principle.

The imaginary parting surface is provided with the reference numeral 24 in FIG. 4.

In particular, for example, the coupling region 11 has a groove/a slot/a furrow 20 which does not extend completely through the material of the coupling region 11. It also extends only over a partial segment of the coupling region 11, but at least from an open end of the adjusting element 6 which is facing the reflective element 3. The index geometry 18 also has a projection/a rib/a prominence 21 which is extending radially outward from the connection area 7 in the direction of the coupling region 11. The projection/the rib/the prominence 21 engages in the groove/the slot/the furrow with as little play as possible, in the best case even completely without play.

As can also be seen clearly in FIGS. 5 and 6, in which two embodiments and/or two different positions/basic positions of a single embodiment are shown, the groove/the slot/the furrow 20 has a polygonal/a trapezoidal/a parallelogram like cross-section. The protrusion/the rib/the prominence 21 itself has a truncated outer contour with an opening angle of approximately 45°, 30°, 20°, 15°±2.5°.

In FIG. 5, the supporting element 2 is shown in a first basic position relative to the adjusting element 6, and in FIG. 6 in a second basic position. Not only in the first basic position but also in the second basic position, the first operating state is present. A twisting about only two axes, which are aligned in an orthogonal manner to each other, namely the vertical axis and a first horizontal axis, remains possible in this case.

If an overtorque is applied, the projection 21 jumps off the groove 20 because a link of the adjusting element 6 springs inward and/or a link of the supporting element 2 springs outward. The second operating state is now present.

During this second operating state, the supporting element 2 is pivoted relative to the adjusting element 6 about a further/second horizontal axis. Then, the upper projection 21 in FIG. 5 performs a 90° rotation and engages again into another groove 20 as this is shown in FIG. 6. Only then the second basic position is assumed, and the first operating state is again present.

The necessary overtorque is preset by the obliquity of the outer contour of the projection/the rib/the prominence 21 and the restoring properties of the supporting element 3 and/or the adjusting element 6 in the area of the index geometry 18.

The restoring properties of not only the supporting element 2 but also of the adjusting element 6, and the opening angle of the truncated projection 21, are therefore matched to one another in such a way that they ensure a linear contact between the supporting element 2 and the projection 21 of the adjusting element 6; wherein such a choice is made in selective manner that, if the overtorque is exceeded (above the limit torque), a breakout of the projection/the rib/the prominence 21 from the groove/the slot/the furrow 20 is permitted, and a displacement of the supporting element 2 by, for example, 30°, 60° or, as shown here, 90°, is possible.

A connection system 22, which is made possible as a result, is shown in FIGS. 7 and 8 in order to implement a connection to the motor vehicle. The connection system 22 also has a tube 23.

Figure 9:
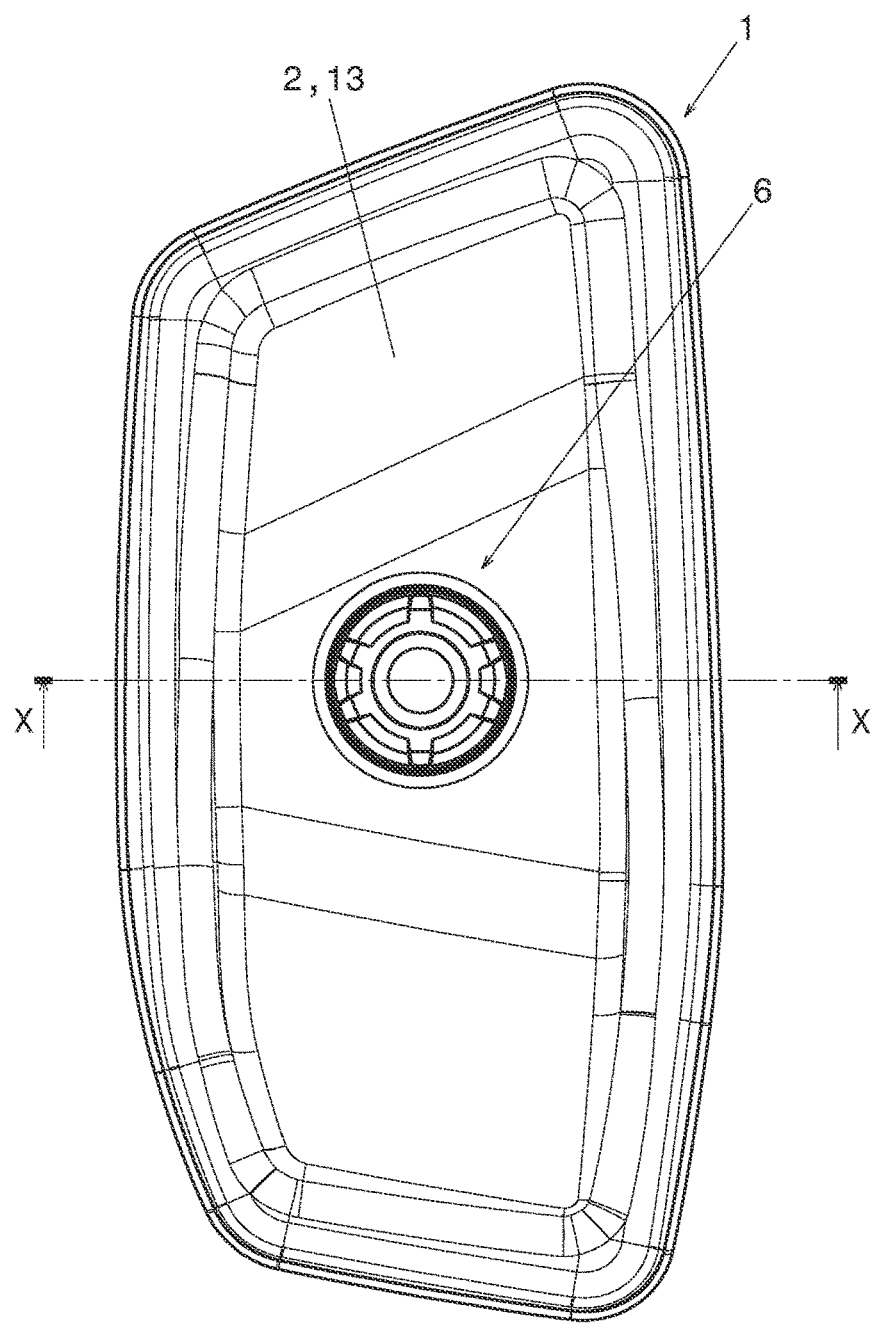
Figure 10:
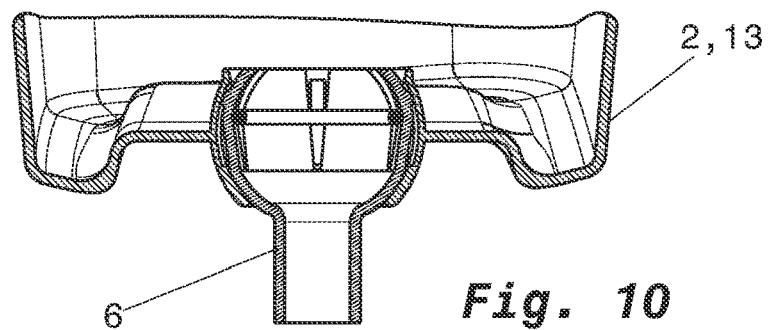
Figure 11:
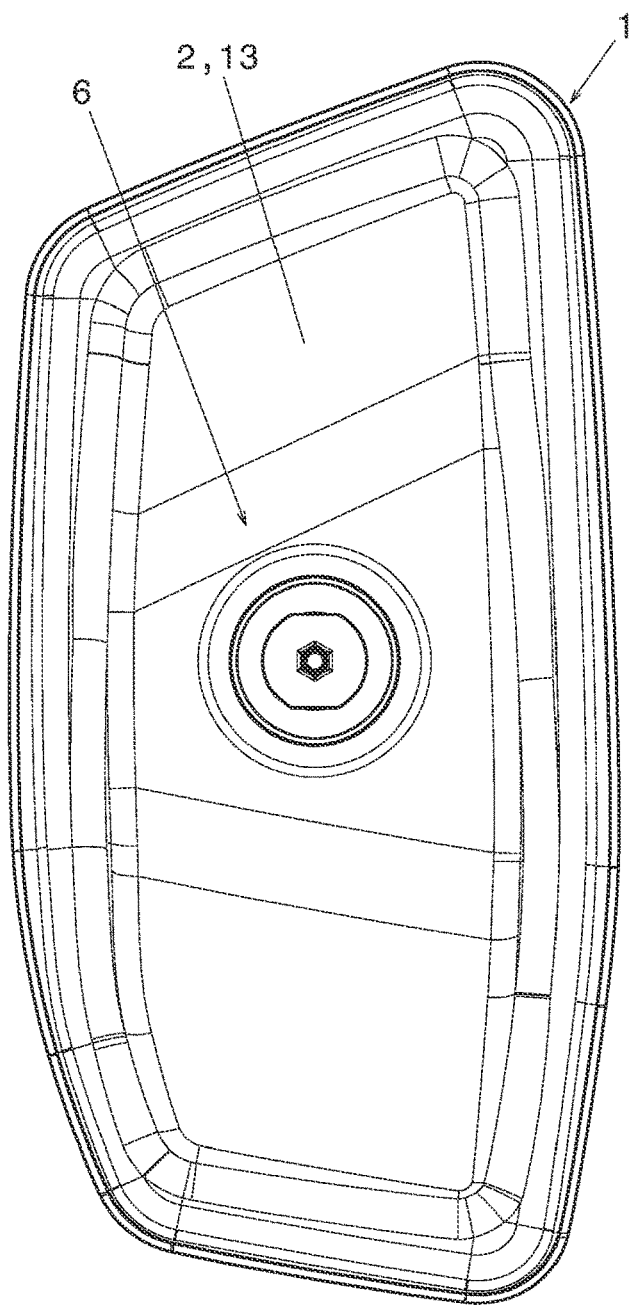
Figure 12:
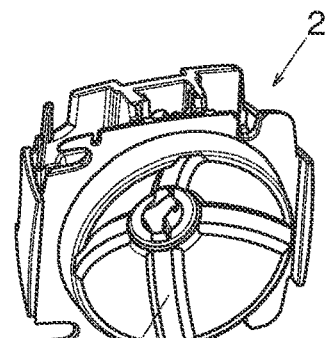
Figure 13:
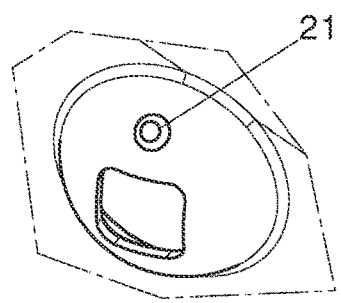
Figure 14:
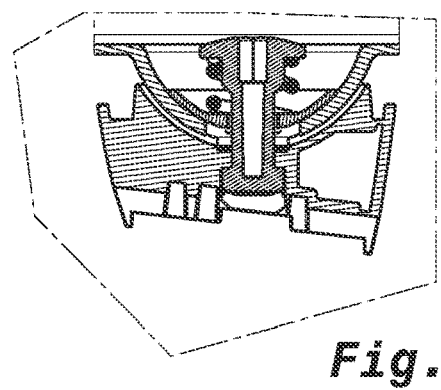
Figure 15:
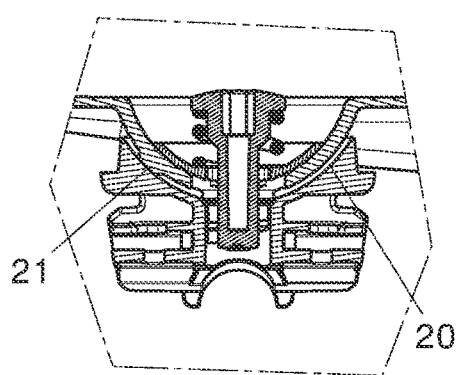

In the FIGS. 9 and 10 a further embodiment is shown, in which the supporting element 2 is closed, and formed horizontally and vertically with a groove. The adjusting element 6 is slotted and formed with a projection, and is in particular self resilient or is provided with an optional spring element. In contrast to the embodiment according to FIG. 4, the spring element is inside and inserted into the supporting element 2 from above.

In the FIGS. 11 to 15 a further embodiment is shown, in which the supporting element 2 has a shell like design with a projection on one side. Here, the shell like adjusting element 6 is provided with a horizontal and vertical groove. There is a thrust carrying piece in order to absorb the spring force. There is a connecting element for pretensioning of the spring and for locking all component parts.

Figure 16:
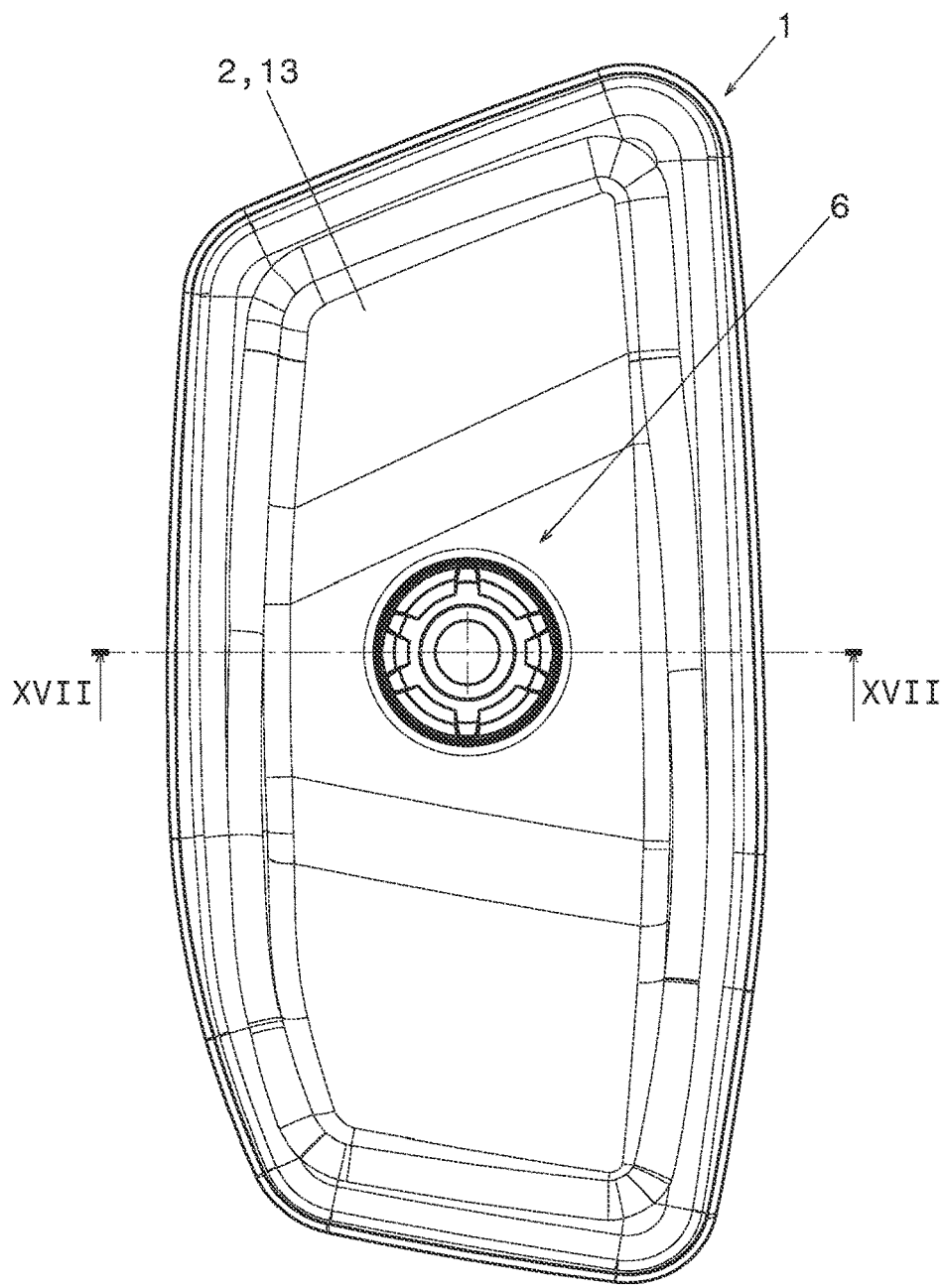
Figure 17:
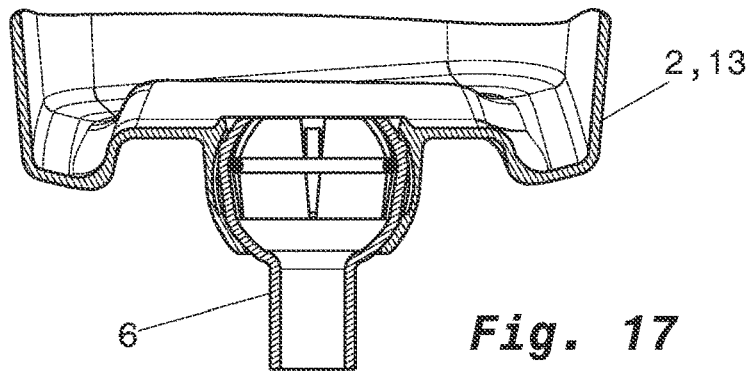

In the FIGS. 16 and 17 a further embodiment is shown, in which the supporting element 2 is closed, and is provided with (each) a horizontally and vertically aligned groove. The adjusting element 6 is slotted, is formed with a projection and is, in particular, self resilient, or provided with an optional spring element. In contrast to the embodiment of FIG. 4, the spring element is arranged on the inside. In contrast to the embodiment of FIG. 10, a joint contact region is inserted into the supporting element 2 from above, offset on one side in the edge region of the counter contact region 8.

Figure 18:
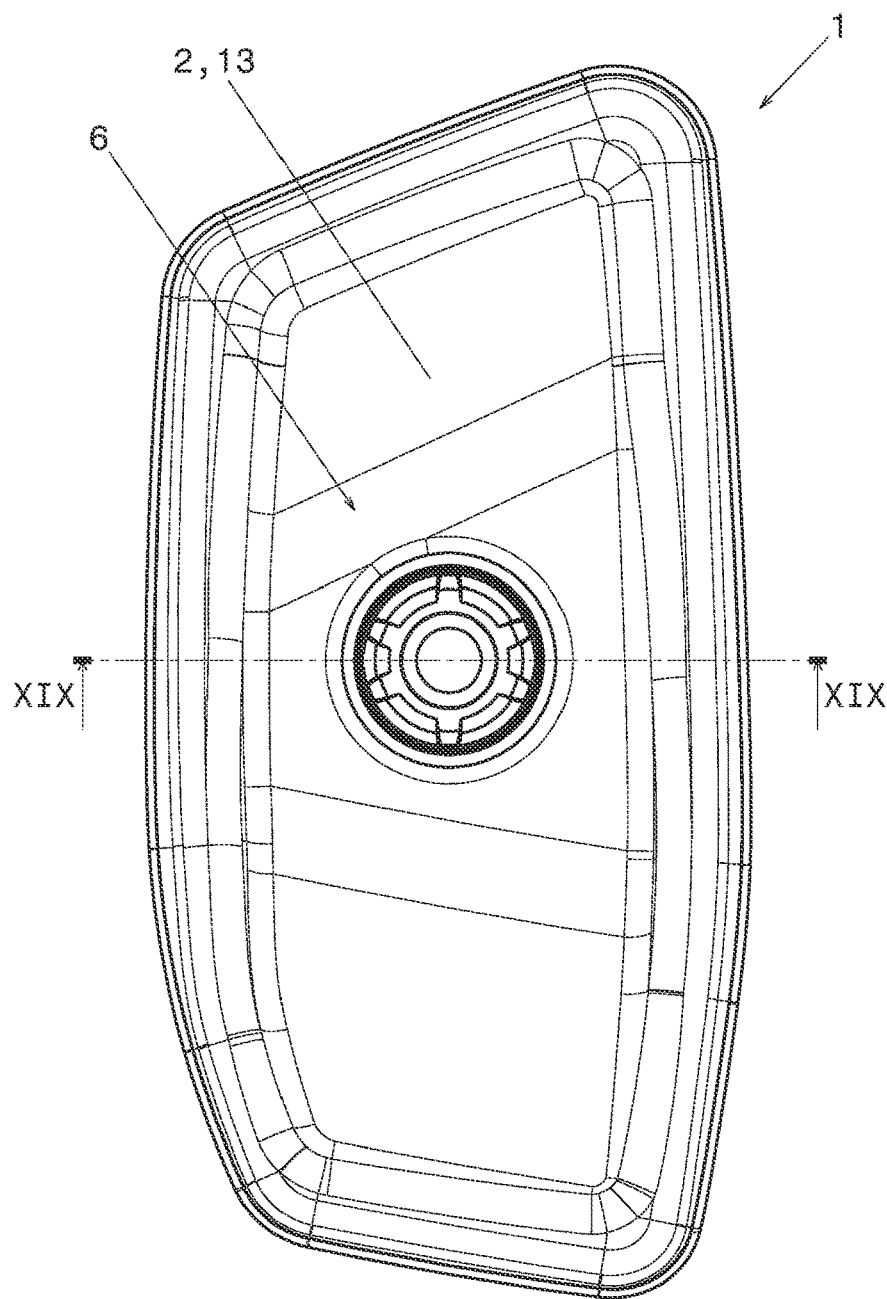
Figure 19:
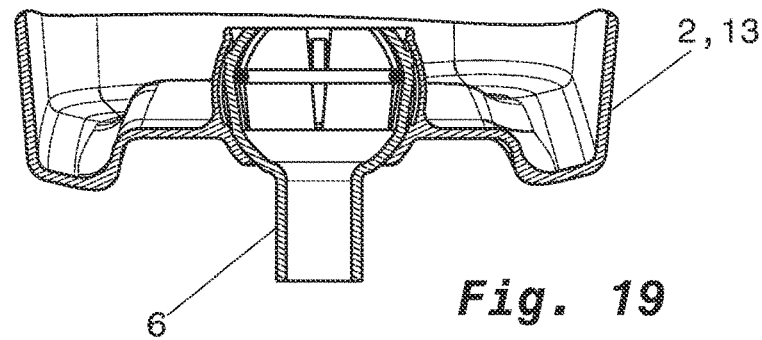

In the FIGS. 18 and 19 a further embodiment is shown, in which the supporting element 2 is closed, namely with a groove (horizontally and vertically). In this case, the adjusting element 6 is slotted with a projection, therefore designed to be self resilient or with an optional spring element. In contrast to the subject matter of FIG. 4, the spring element is arranged on the inside. In contrast to the subject matter of FIG. 10, the joint contact area is inserted into the supporting element 2 from above, offset on one side in the edge region of the counter contact region 8.

Figure 20:
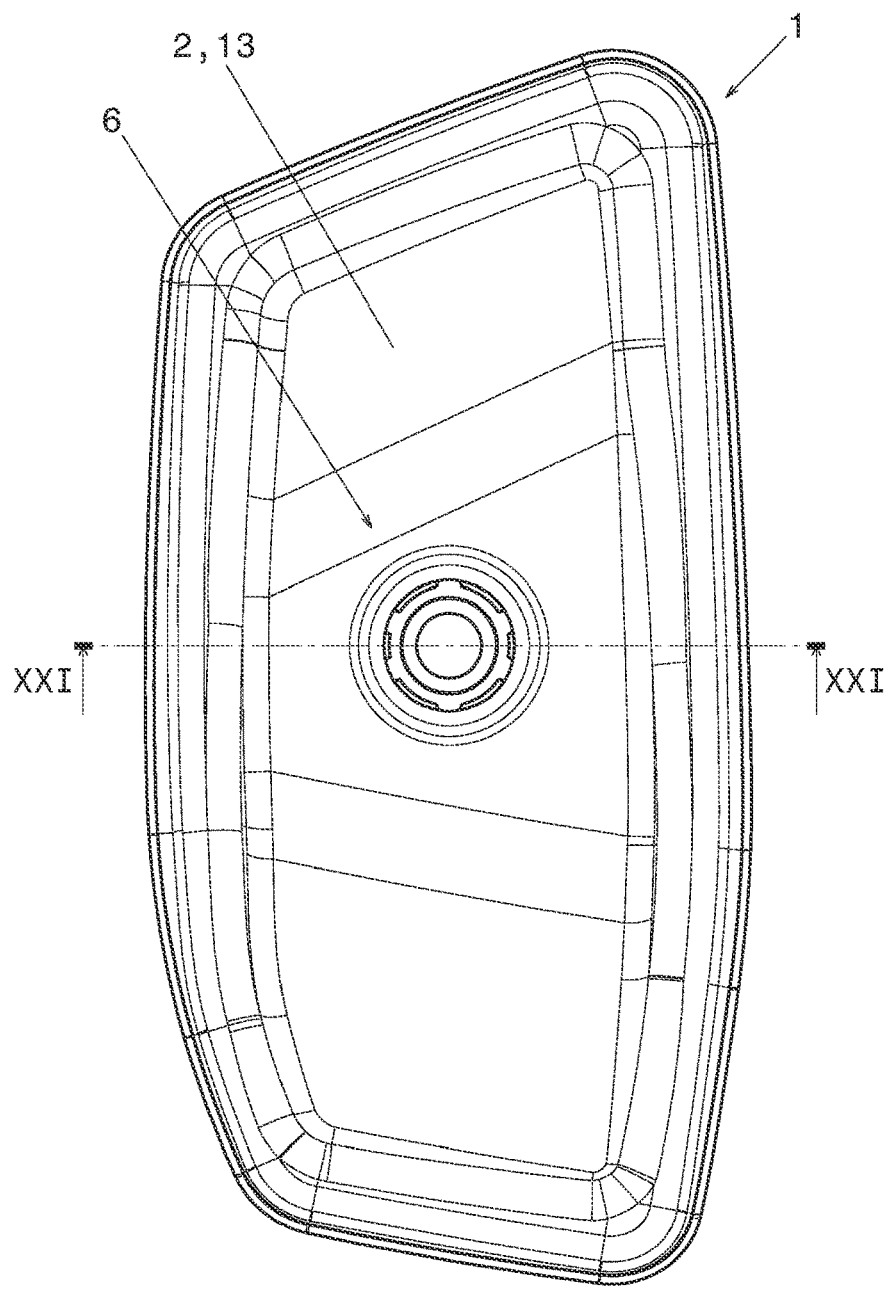
Figure 21:
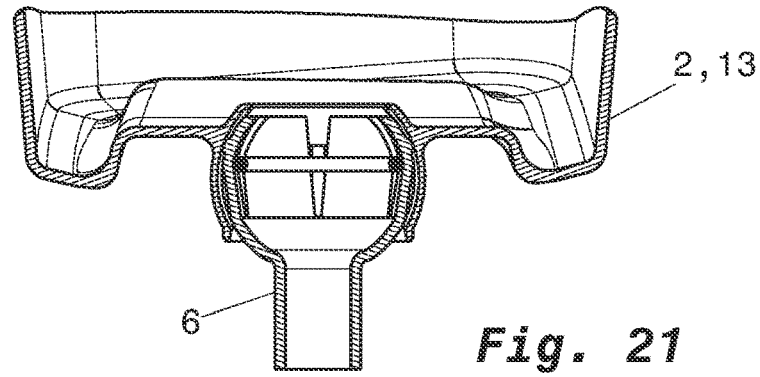
Figure 22:
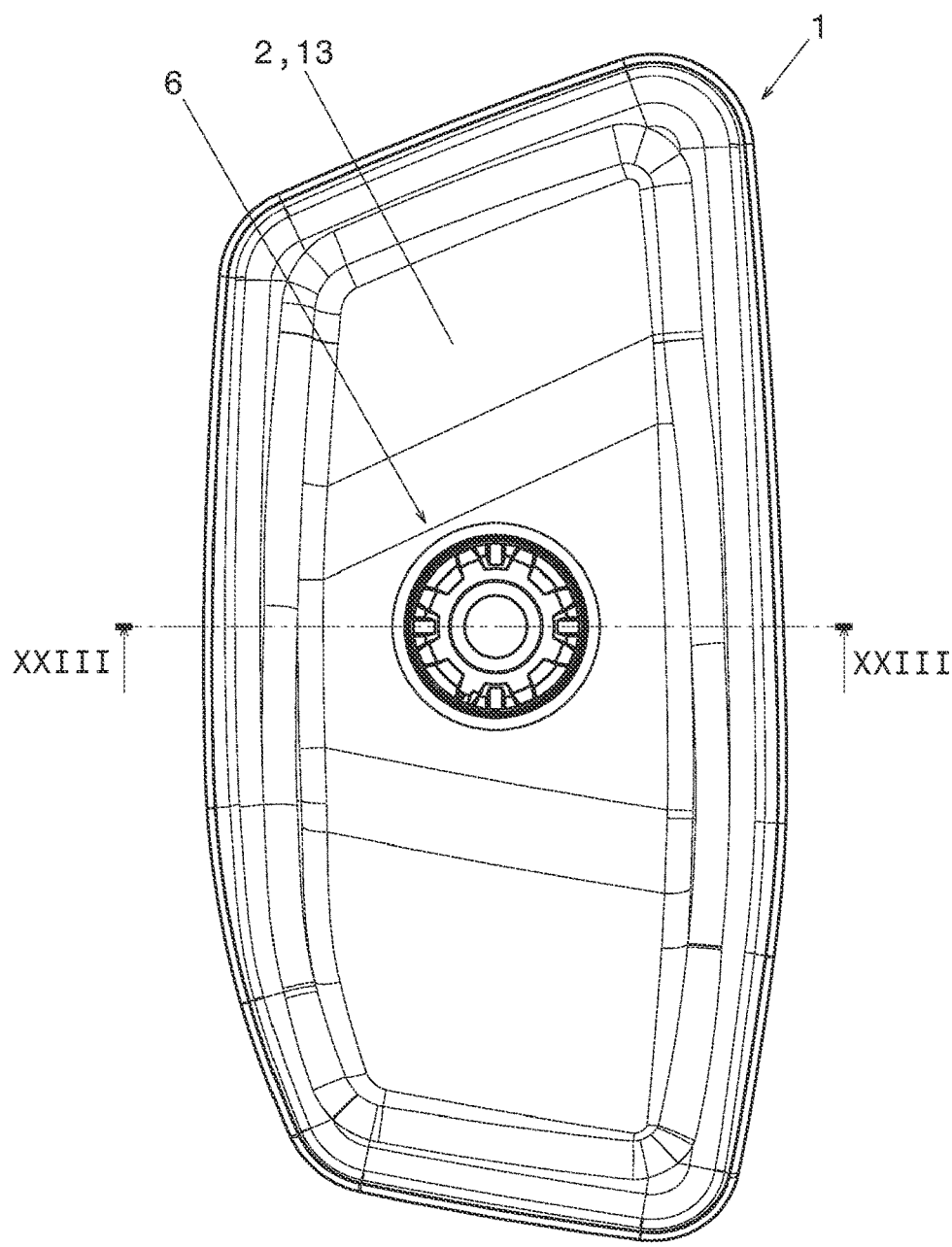
Figure 23:
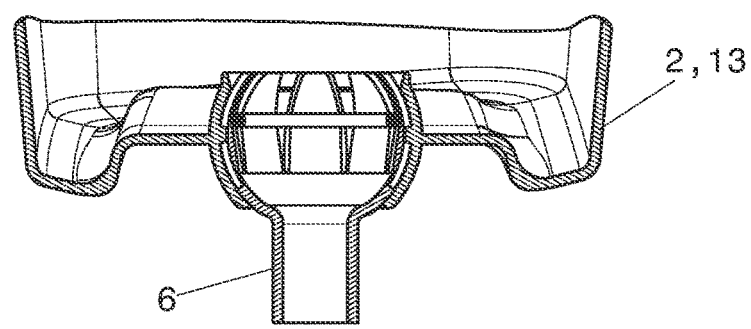

In the FIGS. 20 and 21 a further embodiment is shown, in which the supporting element 2 is closed, namely with a groove (horizontally and vertically). In this case, the adjusting element 6 is slotted with a projection, therefore designed to be self resilient or with an optional spring element. In contrast to the subject matter of FIG. 4, the spring element is arranged on the inside. In contrast to the subject matter of FIG. 10, the joint contact area is inserted into the supporting element 2 from below, offset on one side in the edge region of the counter contact region 8.

In the FIGS. 20 and 21 [22 and 23? Anm.d.Übers] a further embodiment is shown, in which the supporting element 2 is closed, namely with a projection. The adjusting element 6 is slotted with a groove (horizontally and vertically), is designed to be self resilient or provided with an optional spring element. In contrast to the embodiment of FIG. 4, the spring element is arranged on the inside and inserted into the supporting element from above. Hence, in contrast to all other embodiments of FIGS. 9 to 21, there is a reverse arrangement of "projection and groove".

LIST OF REFERENCE NUMERALS 1 indirect rear viewing system
2 supporting element
3 reflective element
4 upper mirror glass
5 lower mirror glass
6 adjusting element
7 crowned connection area
8 counter contact region
9 first contact region
10 second contact region
11 coupling region
12 area of transition
13 main body
14 trough
15 pivot point
16 flattening
17 slot
18 index geometry
19 anti rotation means
20 groove
21 projection/rib/prominence
22 connection system
23 tube
24 imaginary parting surface
25 first axis of rotation
26 second axis of rotation
27 third axis of rotation

The invention claimed is:

1. An indirect rear viewing system for a motor vehicle comprising:
   a supporting element for fastening at least one reflective element, wherein the supporting element has a coupling region for a position variable fastening or attachment to an adjusting element, the adjusting element being fixed with respect to the vehicle, wherein the coupling region contacts a counter contact region of the adjusting element, wherein interlocking anti rotation means are present on the supporting element and on the adjusting element, wherein the anti rotation means define an index geometry, wherein the anti rotation means, in a first operating state, permits an adjustment of the supporting element relative to the adjusting element about two axes of rotation, which are transverse to one another, and, wherein the anti rotation means, in at least a second operating state, permits a basic position change of the supporting element relative to the adjusting element about a third axis of rotation which is aligned transversely to the two other axes of rotation.

2. The indirect rear viewing system according to patent claim 1, wherein the supporting element and the adjusting element, with respect to their geometry, material thickness and material properties, are matched to each other in such a way that, if an overtorque is present, which is greater than a predetermined limit torque, a transition from the first operating state to the second operating state is enabled or forced.

3. The indirect rear viewing system according to patent claim 2, wherein the adjusting element has a crowned connection area which forms the counter contact region.

4. The indirect rear viewing system according to patent claim 3, wherein the supporting element and the adjusting element are specifically designed in such a way that restoring properties and moduli of elasticity of the supporting element and the adjusting element are matched to the contour of the anti-rotation means in such a manner that when the overtorque is present, the at least second operating state is forcibly assumed.

5. The indirect rear viewing system according to patent claim 4, wherein a first index geometry component is designed as a a groove, a slot or a furrow, and a second index geometry component is designed as a projection, a rib or a prominence.

6. The indirect rear viewing system to patent claim 5, wherein the groove, the slot or the furrow is present on the supporting element, and the projection is present on the adjusting element, or vice versa.

7. The indirect rear viewing system according to patent claim 6, wherein the predetermined limit torque is at least 10% greater than a torque, which occurs in the first operating state, which is required in order to keep the supporting element stable relative to the adjusting element.

8. The indirect rear viewing system according to patent claim 7, wherein the projection, the rib or the prominence engages into the groove, the slot or the furrow without any play.

9. The indirect rear viewing system according to patent claim 8, wherein the projection has, in a cross-section orthogonal to a longitudinal axis of the groove, the slot or the furrow, a beveled side which is contoured in order to make a line contact with the material which is forming the groove, the slot or the furrow.

10. The indirect rear viewing system according to patent claim 9, wherein the projection has a conical contour or a truncated cone contour or a contour in the form of a spherical segment or a spherical or ellipsoidal contour at least in an active area.

11. The direct rear viewing system according to patent claim 10, wherein the index geometry is composed of two component parts, at least one of which is formed in an elastic manner.

12. An indirect rear viewing system for a motor vehicle comprising:
  a supporting element for fastening at least one reflective element, the supporting element comprising a coupling region defining a socket;
  an adjustment element attached to the motor vehicle independently of the supporting element, the adjustment element comprising a ball joint having a crowned connection area and a counter contact region, the ball joint being received within the socket of the coupling region, the counter contact region being in contact with the coupling region;
  wherein a tongue-and-groove, anti-rotation, index geometry is defined between the supporting element and the adjusting element to couple the supporting element and the adjusting element,
  wherein the tongue-and-groove, anti-rotation, index geometry defines a first operating state and a second operating state,
  wherein the first operating state permits an adjustment of the supporting element relative to the adjusting element about a first axis of rotation and a second axis of rotation, the first and second axes of rotation being mutually transverse, and
  wherein the second operating state permits a pivoting of the supporting element relative to the adjusting element about a third axis of rotation, the third axis of rotation being transverse to the first and second axes of rotation.

* * * * *